(No Model.)

S. E. DYSINGER.
CULINARY DEVICE.

No. 510,010. Patented Dec. 5, 1893.

Attest
M. F. Altemus.
Wm. F. Hall

Inventor
Sarah E. Dysinger
by Hallern Mallarm & Co.
Attys

UNITED STATES PATENT OFFICE.

SARAH E. DYSINGER, OF ELDORA, IOWA.

CULINARY DEVICE.

SPECIFICATION forming part of Letters Patent No. 510,010, dated December 5, 1893.

Application filed May 9, 1893. Serial No. 473,615. (No model.)

*To all whom it may concern:*

Be it known that I, SARAH E. DYSINGER, a citizen of the United States of America, residing at Eldora, in the county of Hardin and State of Iowa, have invented certain new and useful Improvements in Culinary Devices, of which the following is a specification, reference being had therein to the accompanying drawings.

It is the object of my invention to provide a holder or stand for supporting cooking utensils, said stand being adapted to rest upon an ordinary stove or upon a gasoline stove having a grated or open work top plate.

Figure 1:
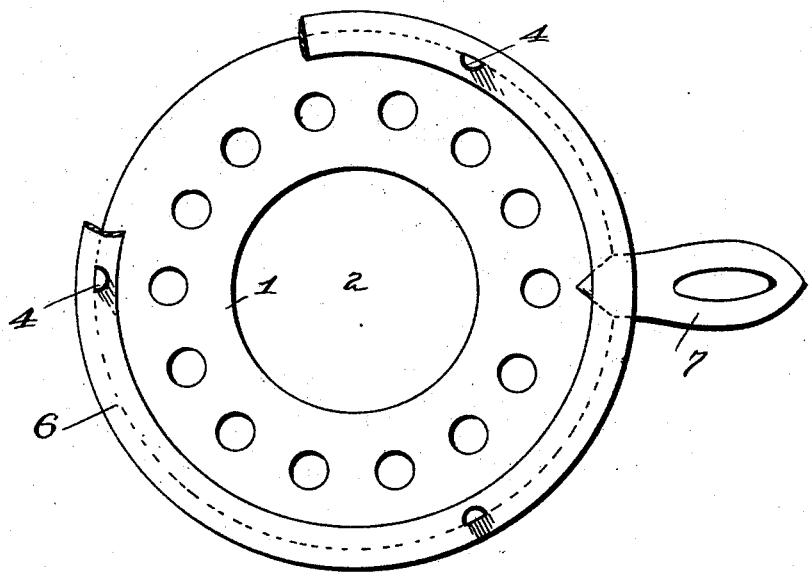
Figure 2:
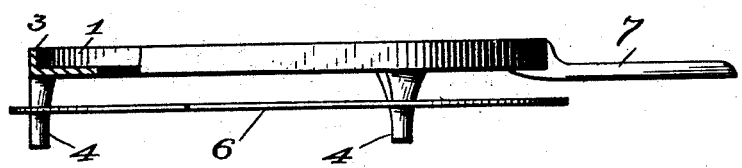

In the accompanying drawings, Figure 1, is a bottom plan view of the device, and Fig. 2, is a side elevation partly in section.

The support consists of a flat plate 1 having an open center 2, and an outer flange 3, adapted to retain the cooking vessel against lateral displacement. The supporting plate is perforated about the central opening to permit the heat to pass through it to the bottom of the vessel being supported. Downwardly projecting feet 4 support the plate at a proper distance above the stove and in the present instance I have shown three of these feet disposed about the under outer edge of the plate. The stand thus far described will serve to support any suitable vessel over an ordinary stove, but in order to apply the device to a gasoline or like stove having an open work top additional means is necessary in order to preserve the level of the device and allow it to be placed in any desired position, for it will be understood that otherwise one or more of the feet will pass through the open top and thus render the support insecure and out of proper level. I therefore provide the feet with a ring 6 which is perforated to receive them and is arranged thereon about midway between the lower ends of the feet and the plate. When the device is used on an open top stove the feet may pass down through the openings until the ring contacts with the stove top and thus the device will be supported through the medium of said ring. The feet are preferably tapered toward their lower ends so that pressure will serve to firmly connect the ring with the feet. The ring may be made removable if desired or it may be kept in place, it not interfering with the ordinary use of the device on a flat top stove. A handle 7 is provided at one side as shown.

I claim as my invention—

1. A stand for cooking utensils comprising a plate and feet secured thereto and a ring arranged intermediately of the length of the feet between the plate and the lower ends of the feet, substantially as described.

2. A stand for cooking utensils comprising a flat plate 1 having an open center, an outer flange 3, tapering feet supporting the same and a ring having openings corresponding to the position of the feet and adapted to receive the lower ends thereof, substantially as described.

In testimony whereof I affix my signature in presence of two witnesses.

SARAH E. DYSINGER.

Witnesses:
E. H. LUNDY,
Mrs. F. A. NORRIS.